US012085759B2

(12) United States Patent
Matte-Breton et al.

(10) Patent No.: US 12,085,759 B2
(45) Date of Patent: Sep. 10, 2024

(54) METHOD OF COUPLING OPTICAL FIBERS, AND OPTICAL COUPLER

(71) Applicant: UNIVERSITÉ LAVAL, Québec (CA)

(72) Inventors: Charles Matte-Breton, Québec (CA); Sophie Larochelle, Québec (CA); Simon Duval, Québec (CA); Réal Vallée, Québec (CA); Martin Bernier, Québec (CA)

(73) Assignee: Université Laval, Quebec (CA)

( * ) Notice: Subject to any disclaimer, the term of this patent is extended or adjusted under 35 U.S.C. 154(b) by 223 days.

(21) Appl. No.: 17/636,397

(22) PCT Filed: Aug. 20, 2020

(86) PCT No.: PCT/CA2020/051132
§ 371 (c)(1),
(2) Date: Feb. 18, 2022

(87) PCT Pub. No.: WO2021/030911
PCT Pub. Date: Feb. 25, 2021

(65) Prior Publication Data
US 2022/0276443 A1 Sep. 1, 2022

Related U.S. Application Data

(60) Provisional application No. 62/889,775, filed on Aug. 21, 2019.

(51) Int. Cl.
*G02B 6/28* (2006.01)
(52) U.S. Cl.
CPC ............. *G02B 6/2821* (2013.01)

(58) Field of Classification Search
CPC ............. G02B 6/28; G02B 6/2821
See application file for complete search history.

(56) References Cited

U.S. PATENT DOCUMENTS

| 4,815,079 A | 3/1989 | Snitzer et al. |
| 4,923,268 A | 5/1990 | Xu |

(Continued)

FOREIGN PATENT DOCUMENTS

| CN | 103151687 B | 8/2015 |
| CN | 110071415 | 7/2019 |

(Continued)

OTHER PUBLICATIONS

Duval et al., "1.7-W femtosecond fiber-based source at 3.6 µm", Frontiers in Optics 2016, OSA Technical Digest (online) (Optical Society of America, 2016), paper FF2B.5.

(Continued)

*Primary Examiner* — Tina M Wong
(74) *Attorney, Agent, or Firm* — Reno Lessard; Norton Rose Fulbright Canada LLP (57) ABSTRACT

There is described a method of optically coupling a first optical fiber and a second optical fiber to one another. The method generally has a step of bringing a free end of the first optical fiber, the second optical fiber and liquid in close proximity to one another within a coupling region, the free end of the first optical fiber having a dimension below a critical dimension, the free end of the first optical fiber moving within said liquid to contact the second optical fiber along a given coupling length, said contact optically coupling the free end of the first optical fiber and the second optical fiber to one another.

23 Claims, 6 Drawing Sheets

(56) References Cited

U.S. PATENT DOCUMENTS

| | | | |
|---|---|---|---|
| 4,979,972 | A | 12/1990 | Berkey et al. |
| 5,139,550 | A | 8/1992 | Nicholls et al. |
| 5,240,489 | A | 8/1993 | Robson |
| 5,268,014 | A | 12/1993 | Miller et al. |
| 5,430,821 | A | 7/1995 | Sasoka |
| 5,999,673 | A | 12/1999 | Valentin et al. |
| 6,092,394 | A | 7/2000 | Backer et al. |
| 6,370,297 | B1 | 4/2002 | Hakimi et al. |
| 6,546,169 | B1 | 4/2003 | Lin et al. |
| 6,826,335 | B1 | 11/2004 | Grudinin et al. |
| 7,277,612 | B2 | 10/2007 | Sintov |
| 7,933,479 | B2 | 4/2011 | Gonthier et al. |
| 7,991,255 | B2 | 8/2011 | Salokatve |
| 8,743,454 | B2 | 6/2014 | Grudinin et al. |
| 10,084,287 | B2 | 9/2018 | Bernier et al. |
| 2004/0240819 | A1 | 12/2004 | Shima et al. |
| 2006/0029111 | A1 | 2/2006 | Liu |
| 2008/0298746 | A1 | 12/2008 | Holehouse et al. |
| 2018/0069366 | A1 | 3/2018 | Ahmadi |
| 2019/0193196 | A1* | 6/2019 | Ye .................. C03C 25/105 |

FOREIGN PATENT DOCUMENTS

| | | |
|---|---|---|
| JP | S53137856 | 4/1986 |
| JP | H10227940 A | 8/1998 |
| JP | 2004273581 A | 9/2004 |
| JP | 2016212427 A | 12/2016 |

OTHER PUBLICATIONS

"The influence of fused depth on the side-pumping combiner for all-fiber lasers and amplifiers" C Lei, Z Chen, J Leng, Y Gu, J Hou—Journal of Lightwave Technology, vol. 35, No. 10, May 15, 2017.

Simon Duval et al.—"Watt-level fiber-based femtosecond laser source tunable from 2.8 to 3.6 μm", vol. 41, No. 22 / Nov. 15, 2016 / Optics Letters, pp. 5294-5297.

Louis-Rafaël Robichaud et al.—"Compact 3-8 μm supercontinuum generation in a low-loss As2Se3 step-index fiber", vol. 41, No. 20 / Oct. 15, 2016 / Optics Letters, pp. 4605-4608.

Simon Duval et al.—"Femtosecond fiber lasers reach the mid-infrared", vol. 2, No. 7 / Jul. 2015 / Optica, pp. 623-626.

C. A. Schäfer et al. "Fluoride-fiber-based side-pump coupler for high-power fiber lasers at 2.8 μm", Optics Letters, 43 (10), 2340-2345.

Jean-Christophe Gauthier et al.—"Mid-IR supercontinuum from 2.4 to 5.4 μm in a low-loss fluoroindate fiber", vol. 41, No. 8 / Apr. 15, 2016 / Optics Letters, pp. 1756-1759.

Jean-Christophe Gauthier et al.—"In-amplifier mid-infrared supercontinuum generation", vol. 40, No. 22 / Nov. 15, 2015 / Optics Letters, pp. 5247-5250.

Yoav Sintov et al.—"A novel side coupling technique for rugged all-fiber lasers and amplifiers"—art. No. 65520R, Electro-Optics Division, Soreq NRC, Yavne 81800, Israel, Conference Paper in Proceedings of SPIE—The International Society for Optical Engineering—May 2007, DOI: 10.1117/12.721420, https://www.researchgate.net/publication/257875937.

* cited by examiner

METHOD OF COUPLING OPTICAL FIBERS, AND OPTICAL COUPLER

FIELD

The improvements generally relate to optical fibers, and more specifically relate to optically coupling optical fibers to one another.

BACKGROUND

In some types of optical couplers, one smaller optical fiber such as a fiber taper is to be optically coupled to a larger optical fiber, or vice versa, so that a light signal propagating in an optical fiber is transferred to another optical fiber with the highest possible efficiency. In such situations, bringing the smaller optical fiber to the larger optical fiber in a manner which favors a continuous optical coupling between the smaller and larger optical fibers can be challenging. Existing methods of optically coupling a smaller optical fiber to a larger optical fiber generally consist of positioning the smaller and larger optical fibers under tension alongside each other. While the tension is maintained on both optical fibers, the smaller and larger optical fibers are contacted to one another and then fused, or otherwise adhered, to one another, thereby fixing the optical coupling between the two fibers. Although existing methods of optically coupling optical fibers to one another are satisfactory to a certain degree, there remains room for improvement.

SUMMARY

It was found that a need exists in optically coupling a smaller optical fiber to a larger optical fiber, or vice versa, while reducing risks associated in tensioning, fusing and/or manipulating the smaller and larger optical fibers, and/or to improve the efficiency in the transfer of the light signal from one optical fiber to the other.

In accordance with a first aspect of the present disclosure, there is provided a method of optically coupling a first optical fiber and a second optical fiber to one another, the method comprising: bringing a free end of the first optical fiber, the second optical fiber and liquid in close proximity to one another within a coupling region, the free end of the first optical fiber having a dimension below a critical dimension, the free end of the first optical fiber moving within said liquid to contact the second optical fiber along a given coupling length, said contact optically coupling the free end of the first optical fiber and the second optical fiber to one another.

Further in accordance with the first aspect of the present disclosure, the second optical fiber can for example not be under tension during said bringing.

Still further in accordance with the first aspect of the present disclosure, said bringing can for example include bringing the free end and the second optical fiber in close proximity to one another within the coupling region and then injecting the liquid within said coupling region.

Still further in accordance with the first aspect of the present disclosure, the method can for example further comprise, after said liquid has evaporated, adhering the free end of the first optical fiber and the second optical fiber to one another.

Still further in accordance with the first aspect of the present disclosure, the method can for example further comprise, prior to said bringing, tapering the first optical fiber leaving a waist portion extending between down- and up-taper portions, and removing one of the down- and up-taper portions from the first optical fiber to free the waist portion thereby acting as the free end of the first optical fiber.

Still further in accordance with the first aspect of the present disclosure, the method can for example further comprise tensioning the second optical fiber during said bringing.

Still further in accordance with the first aspect of the present disclosure, said moving can for example further include the free end of the first optical fiber helicoidally wrapping around the second optical fiber.

Still further in accordance with the first aspect of the present disclosure, said bringing can for example be performed gradually in a direction leading to a free tip of the free end of the first optical fiber.

Still further in accordance with the first aspect of the present disclosure, the liquid can for example be an alcohol.

Still further in accordance with the first aspect of the present disclosure, the first and second optical fibers can for example be made from a dissimilar material.

Still further in accordance with the first aspect of the present disclosure, the first optical fiber can for example be made of silica and the second optical fiber can for example be made of a low phonon energy glass.

Still further in accordance with the first aspect of the present disclosure, the dimension of the free end of the first optical fiber can for example be below a dimension of the second optical fiber.

In accordance with a second aspect of the present disclosure, there is provided an optical coupler comprising a first optical fiber, a second optical fiber optically coupled to the first optical fiber, the first optical fiber having free end having a dimension below a critical dimension, the free end of the first optical fiber contacting the second optical fiber along a given coupling length thereby providing an optical coupling.

Further in accordance with the second aspect of the present disclosure, the optical coupler can for example further comprise a protector over the free end and the second optical fiber along the given coupling length, the free end having a free tip with a cleaved-cut endface, e.g., under said protector. In some embodiments, the protector may partially extend over said free end, which may leave a tip of said free end uncovered by said protector.

Still further in accordance with the second aspect of the present disclosure, the protector can for example be made of a polymer having a refractive index lower than that of the first and second optical fibers.

Still further in accordance with the second aspect of the present disclosure, the first and second optical fibers can for example be made from a dissimilar material.

Still further in accordance with the second aspect of the present disclosure, the first optical fiber can for example be made of silica and the second optical fiber can for example be made of a low phonon energy glass.

Still further in accordance with the second aspect of the present disclosure, the free end and the second optical fiber can for example be fused to one another along the given coupling length, the free end having a free tip with a rounded endface.

Still further in accordance with the second aspect of the present disclosure, the free end can for example be wrapped around the second optical fiber. In some embodiments, the free end can be wrapped around the second optical fiber for a number of turn(s), with the number of turn being at least 0.25, preferably at least 0.5 and most preferably at least 1.0.

Still further in accordance with the second aspect of the present disclosure, the free end of the second optical fiber can for example have a length above a given length threshold.

Still further in accordance with the second aspect of the present disclosure, the dimension of the free end of the first optical fiber can for example be below a dimension of the second optical fiber.

It was also found that a need exists in optically coupling a smaller optical fiber to a larger optical fiber without necessarily using conventional glass processing platforms. Typically, such glass processing platforms bring the optical fibers together, and then fused them to one another. Although such glass processing platforms are useful in some situations, they can be costly, difficult to manipulate and/or cumbersome to carry on a customer for repair purposes. Moreover, in cases where optical fibers of different material are to be optically coupled to one another, these glass processing platforms are generally ill-suited as differing melting points imply that as one of the optical fiber is heated to a desired temperature, the other optical fiber may already be irreversibly melt and/or burnt. Accordingly, once the smaller and larger optical fibers are optically coupled to one another using the above-articulated method and that the liquid has evaporated from the coupling region, the optical fibers can be adhered to one another instead of and/or in addition to being fused.

In accordance with a third aspect of the present disclosure, there is provided a use of an optical coupler as defined above as a pump combiner for fiber-based lasers and/or amplifiers. Such optical couplers can allow the optical coupling of pump beams into active optical fibers used in communication networks or in fiber-based lasers and/or amplifiers. More specifically, the methods presented herein can allow the quick and reliable fabrication of pump combiners having a high coupling efficiency without any complex mechanical or heating steps. The methods presented herein can reduce the amount of tricky manipulations of the optical fibers, which may reduce the risk of breaking any one of the optical fibers as they are manipulated. Typical fused fiber combiners tend to disturb the shape of the receiving optical fiber, which can decrease the performance of optical fiber communication systems, especially when cores of the receiving optical fiber are close to the cladding surface. The methods presented herein can also enable the optical coupling between dissimilar optical fibers that have significantly different melting temperatures, e.g., silica-based glass having a melting temperature of about 2000° C. and fluoride-based glass having a melting temperature of about 300° C., and that thus cannot be fused to one another satisfactorily using existing technologies. The methods presented herein can thus enable the fabrication of all-fiber pump combiners using such specialty fibers (e.g., low phonon energy glass such as fluoride glass fibers) that can transmit from the ultraviolet to the mid-infrared region of the electromagnetic spectrum and still avoid the use of complex, bulky, fragile, inefficient and expensive pump combining systems for these fibers.

Many further features and combinations thereof concerning the present improvements will appear to those skilled in the art following a reading of the instant disclosure.

DESCRIPTION OF THE FIGURES

In the figures.

DETAILED DESCRIPTION

FIGS. 1A to 1E illustrate an example of a method of optically coupling a first optical fiber 10 to a second optical fiber 12, in which the first optical fiber 10 has a first dimension $D_1$ which is smaller than a second dimension $D_2$ of the second optical fiber 12.

In some embodiments, the first and second optical fibers 10 and 12 have a similar, nominal dimension, e.g., the second dimension $D_2$. In such embodiments, the first optical fiber 10 can be tapered down to the first dimension $D_1$ for optical coupling purposes. In some other embodiments, the first optical fiber 10 can have a nominal dimension which is smaller than the second dimension $D_2$ of the second optical fiber 12. It is noted that in embodiments where the optical fibers are of circular cross-sectional shapes, the dimension can be a diameter of the respective optical fiber. However, in some other embodiments, the optical fibers may not have a circular cross-sectional shape. For instance, the optical fibers may have a polygonal cross-sectional shape, an irregular cross-sectional shape or any other suitable cross-sectional shape.

In any case, the first dimension $D_1$ is smaller than a critical dimension $D_c$. The critical dimension $D_c$ can vary from one embodiment to another, and is generally defined as a dimension below which a free end 14 of the first optical fiber 10 would freely move, and slide over the second optical fiber 12, when within liquid 16. In some embodiments, the critical dimension $D_c$ is below 50 µm, preferably below 35 µm and most preferably below 20 µm. The critical dimension $D_c$ is dependent upon the first optical fiber 10. For instance, the critical dimension $D_c$ can depend on the shape and/or on the material of the first optical fiber 10.

Figure 1A:
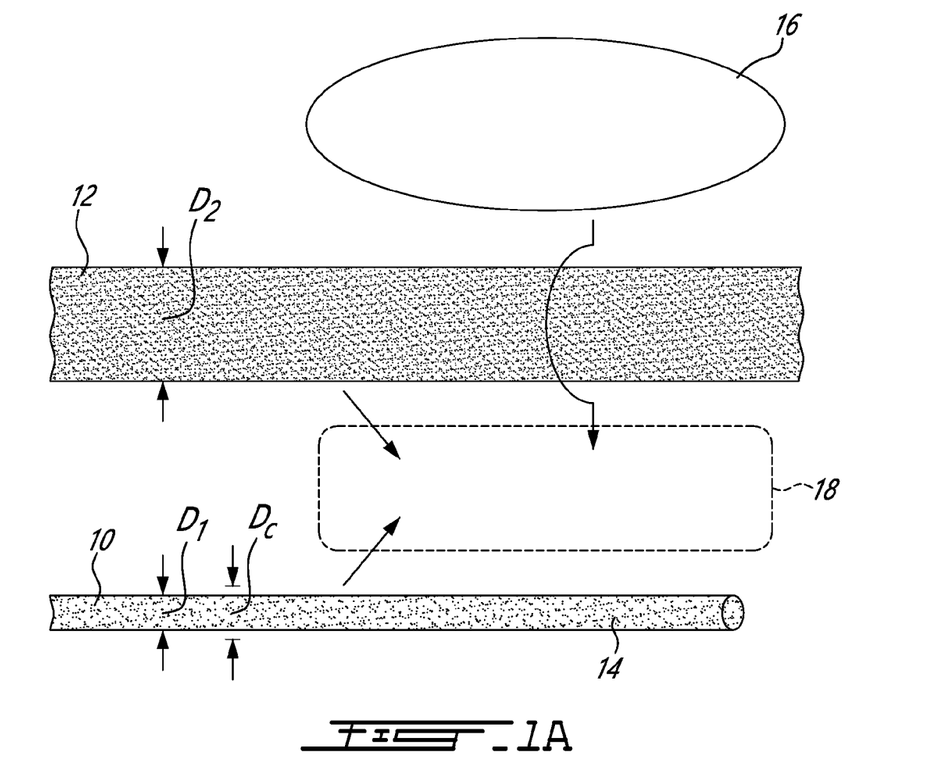
FIGS. 1A to 1E depict steps of an example of a method of optically coupling a first optical fiber to a second optical fiber, in which the first optical fiber has a dimension being smaller than the dimension of the second optical fiber, in accordance with one or more embodiments.
Figure 1B:
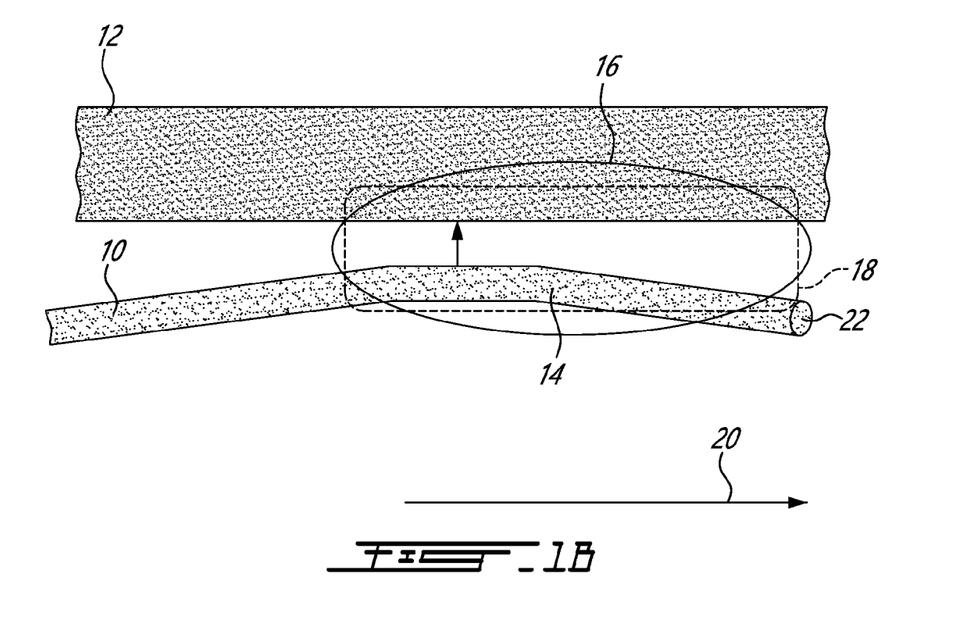
Figure 1C:
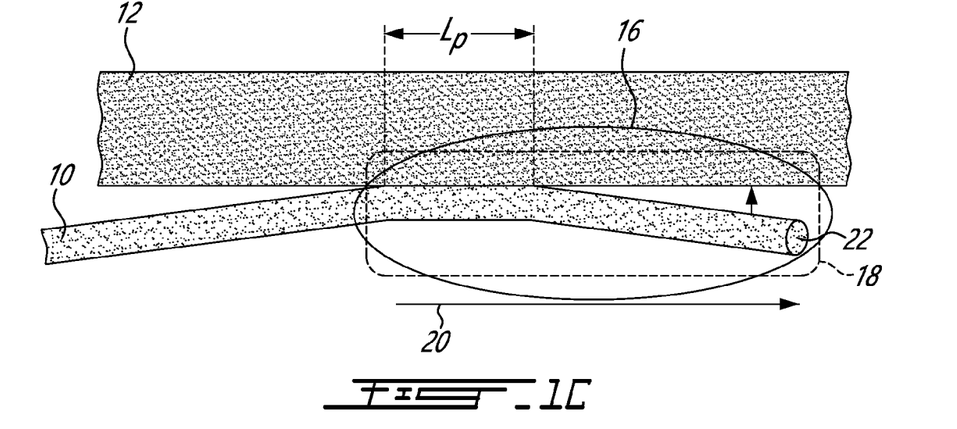
Figure 1D:
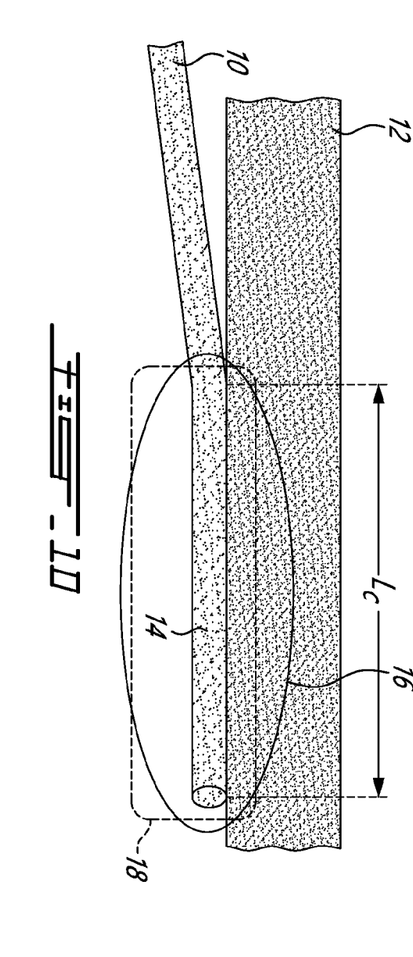
Figure 1E:
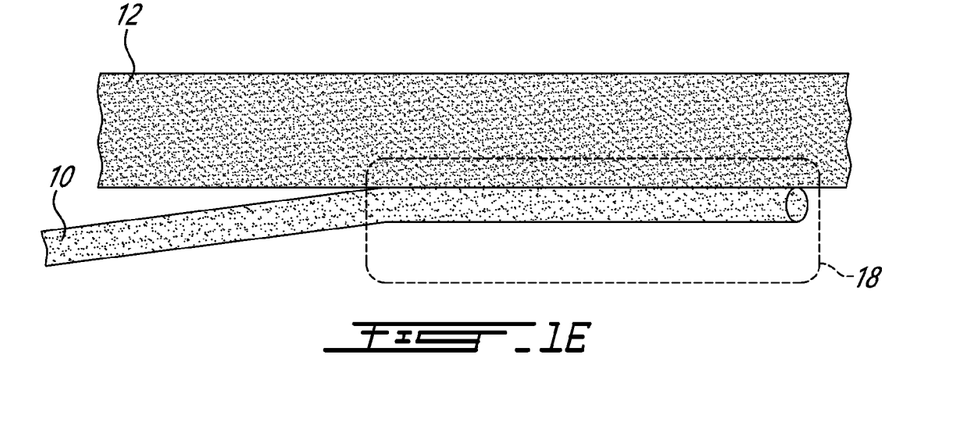

As depicted in FIG. 1A, the first and second optical fibers 10 and 12 are to be optically coupled to one another together with the liquid 16 within a coupling region 18. More specifically, FIG. 1B shows that when the free end 14 of the first optical fiber 10, the second optical fiber 12 and the liquid 16 are brought in close proximity to one another within the coupling region 18, the free end 14 of the first optical fiber 10 moves within the liquid 16 to contact the second optical fiber 12 along a partial coupling length $L_p$, as shown in FIG. 1C, leading a coupling length $L_c$ as shown in FIG. 1D. Now, as the liquid 16 evaporates, the contact that is formed along the coupling length $L_c$ optically couples the free end 14 of the first optical fiber 10 and the second optical fiber 12 to one another, the result of which is shown in FIG. 1E. The coupling length $L_c$ can vary between 5 mm and 100 mm in some embodiments. In some other embodiments, the coupling length $L_c$ can be at least 100 mm, preferably at least 200 mm or more. In some embodiments, the contact is permanently fixed by either fusing or adhering at least the free end 14 and the second optical fiber 12 to one another within the coupling region 18. Alternatively, the contact can be permanently fixed by both fusing and adhering at least the free end 14 and the second optical fiber 12 to one another within the coupling region 18.

As best shown in FIGS. 1B and 1C, the contact formed between the free end 14 and the second optical fiber 12 can be gradually formed along a direction 20 leading to a free tip 22 of the free end 14 of the first optical fiber 10. However, in some other embodiments, the contact can be formed along an opposite direction, or simultaneously all along the coupling length $L_c$.

It is intended that the order in which the free end 14, the second optical fiber 12 and the liquid 16 are brought within the coupling region 18 can vary from one embodiment to another. For instance, the free end 14 and the second optical fiber 12 can be first brought in close proximity to one another within the coupling region 18 and the liquid 16 can be then injected within the coupling region 18. The liquid 16 may be injected using a pipette (e.g., a mL pipette, a liquid spraying device) or any other liquid injection apparatus. In some other embodiments, the liquid 16 can be first injected onto the free end 14 which is then brought in close proximity to the second optical fiber 12 within the coupling region 18. Alternately, or additionally, the liquid 16 can be first injected onto the second optical fiber 12 which is then brought in close proximity to the free end 14 within the coupling region 18.

The type of liquid, and volume thereof, can vary from one embodiment to another. For instance, examples of the liquid 16 can include alcohol such as isopropanol, acetone and the like, solvents such as toluene, water, and any other clean liquid. In some embodiments, alcohol is preferred as it is a fast drying liquid, however any other fast drying liquid can be used. The volume of liquid that is used can also vary based on the first and second dimensions $D_1$ and $D_2$ of the first and second optical fibers 10 and 12, and on the coupling length $L_c$. The evaporation time of the liquid 16 can depend on the type of liquid used and also on the volume thereof.

The first and second optical fibers 10 and 12 can have different geometries. The first and second optical fibers 10 and 12 can also be of different types including, but not limited to, single-clad optical fibers, double-clad optical fibers, multi-clad optical fibers, coreless optical fibers, uni- and multi-core optical fibers, and/or any suitable specialty optical fibers. The first and second optical fibers 10 and 12 can also have similar or dissimilar cross-sections of any suitable shape including, but not limited to, d-shaped, circular, octagonal and the like. Each of the first and second optical fibers 10 and 12 can have one, zero or several cores depending on the embodiment. As can be appreciated, the first and second optical fibers 10 and 12 can be made from a similar material in some embodiments. For instance, the first and second optical fibers 10 and 12 can be both made of silica-based glass or of a low phonon energy glass. In some other embodiments, the first and the second optical fibers 10 and 12 can be made of dissimilar material. For example, the first optical fiber 10 can be made of silica-based glass (with a melting temperature of about 2000° C.) and the second optical fiber 12 can be made of a low phonon energy glass (with a melting temperature of about 300° C.), or vice versa.

In this disclosure, the expression "low phonon energy glass" is intended to encompass any glass having a maximum phonon energy lower than the phonon energy of silica-based glass, i.e., lower than 800 cm$^{-1}$. Optical fibers made of a low phonon energy glass generally have a transmittance window ranging from the ultraviolet (e.g., from 10 nm to 400 nm) to the mid-infrared region (i.e., 2.5 µm to longer wavelengths), unlike fibers made of a high phonon energy glass, such as a silica-based glass, which rather exhibit a transmittance window only in a given portion of the near-infrared (e.g., up to 2.4 µm). Understandably, using a fiber made of a low phonon energy glass allows photons at wavelengths in the mid-infrared to propagate along the length corresponding fiber, in contrast with fibers of a high phonon energy glass which instead prevent propagation of these photons. Accordingly, the method described herein can be particularly useful for optical devices meant to operate in the mid-infrared region of the electromagnetic spectrum. Examples of low phonon energy glass includes fluoride-, chalcogenide-, chalcohalide- or telluride-based glass. In some circumstances, some oxide glasses (e.g., tellurite-based glass) can be considered as a low phonon energy glass. For instance, in some embodiments, the low phonon energy glass is a zirconium fluoride glass having a composition including $ZrF_4$ such as ZBLAN ($ZrF_4$/$HfF_4$, $BaF_2$, $LaF_3$, NaF, and $AlF_3$). In some other embodiments, the low phonon energy glass is an indium fluoride glass having a composition including $InF_3$. In alternate embodiments, the low phonon energy glass is an aluminum fluoride glass having a composition including $AlF_3$. In further embodiments, the low phonon energy glass is a chalcogenide glass having a composition including $As_2S_3$, $As_2Se_3$, AsTe, AsSSe, AsSTe, GaLaS, GeAsS, GeAsSe or the like. Any other suitable low phonon energy glass having a transmittance window in the mid-infrared can be used.

FIGS. 2A to 4F show another example of a method of coupling a first optical fiber to a second optical fiber. In this example, the first optical fiber is a feeding optical fiber 110, i.e., an optical fiber which is meant to feed an optical signal (e.g., a pump signal) into the second optical fiber. Still in this example, the second optical fiber is a receiving optical fiber 112, i.e., an optical fiber which is meant to receive the optical signal from the feeding optical fiber 110. As shown in the specific example shown in FIGS. 2A and 2B, each of the feeding and receiving optical fibers 110 and 112 has a core 130 surrounded by a cladding 132 which is in turn surrounded by one or several layers of coating 134, typically made of polymer(s). As depicted in these figures, the feeding and receiving optical fibers 110 and 112 have a similar nominal dimension $D_0$. Although in this embodiment the feeding optical fiber 110 has the core 130, the feeding optical fiber 110 can be coreless in some other embodiments. Although in this embodiment the receiving optical fiber 112 has a single core, the receiving optical fiber 112 can have multiple cores.

Figure 3A:
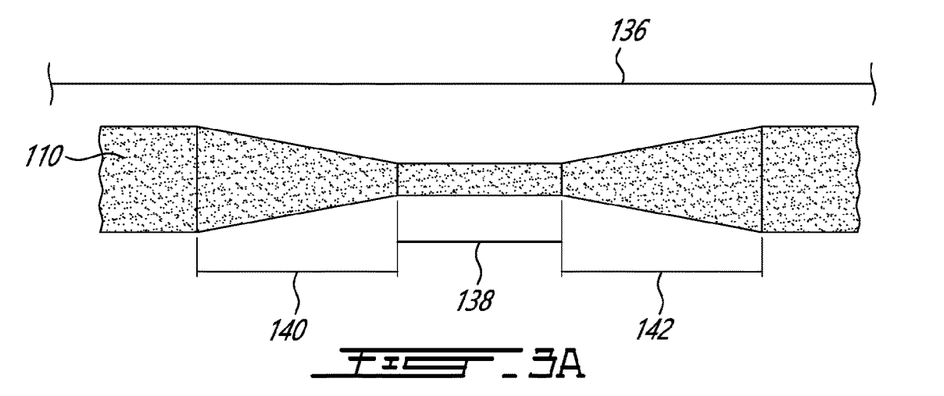
FIG. 3A is a sectional view of the feeding optical fiber of FIG. 2B after tapering, showing a waist portion extending between down- and up-taper portions, in accordance with one or more embodiments.
Figure 3B:
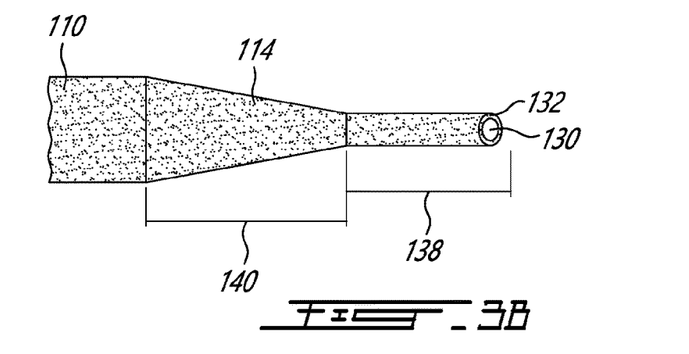
FIG. 3B is a sectional view of the tapered feeding optical fiber of FIG. 3A after removal of the up-taper portion and showing a free end thereof, in accordance with one or more embodiments.

FIG. 3A shows that the feeding optical fiber 110 is uncoated along a given region 136, and then tapered, leaving a waist portion 138 extending between down- and up-taper portions 140 and 142. The tapering can be made by heating the feeding optical fiber 110 and pulling on both ends. In order to obtain a free end 114 of the feeding optical fiber 110, one of the down- and up-taper portions 140 and 142 can be removed from the feeding optical fiber 110. For instance, as depicted in FIG. 3B, the feeding optical fiber 110 is simply cut or otherwise cleaved proximate a junction of the waist portion 138 and the up-taper portion 142. Preferably, the feeding optical fiber 110 is cut so as to remove most, or most preferably the entirety, of the up-taper portion 142. It was found that leaving a portion of the up-taper portion 142 can result in an undesired weight at the end of the free end 114, thereby impeding the free movement of the free end 114 of the feeding optical fiber 110 when within liquid. However, such a portion of the up-taper portion 142 may remain in a free-standing fashion at the end of the waist portion 138 in some embodiments, as long as the undesired weight is below a given undesirable weight threshold. Preferably, a tip of the free end 114 lies either in the down-taper portion 140 or in the waist portion 138 to avoid an undesirable weight at the tip. Cutting the feeding optical fiber 110 somewhere along the waist portion 138 can be satisfactory as well. In some embodiments, the waist portion 138 is longer than a given length threshold.

Figure 2A:
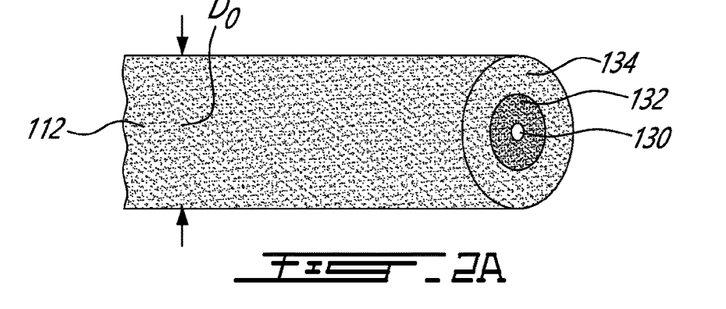
FIG. 2A is a schematic view of an example of a receiving optical fiber, in accordance with one or more embodiments.
Figure 2B:
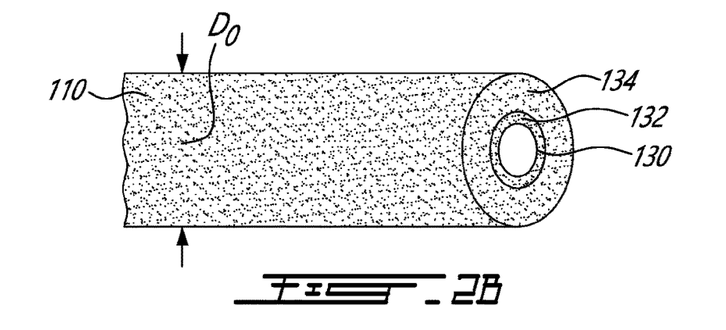
FIG. 2B is a schematic view of an example of a feeding optical fiber, in accordance with one or more embodiments.

FIGS. 4A to 4F depict the steps of an example of a method of optically coupling the receiving optical fiber 112 of FIG. 2A to the free end 114 of the tapered feeding optical fiber 110 of FIG. 3B within a coupling region 118 using a liquid 116.

Figure 4A:
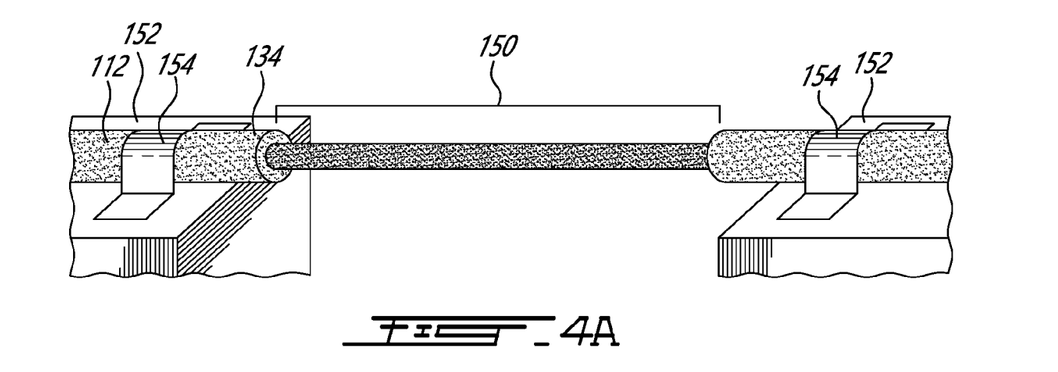
FIGS. 4A to 4F depict steps of an example of a method of optically coupling the receiving optical fiber of FIG. 2A to the free end of the tapered feeding optical fiber of FIG. 3B within a coupling region using liquid, in accordance with one or more embodiments.

As depicted in FIG. 4A, the coating 134 of the receiving optical fiber 112 is removed along a given portion of the receiving optical fiber, hereinafter referred to as the "uncoated portion 150." The uncoated portion 150 can have a length extending to 15 cm in some embodiments. As shown, the receiving optical fiber 112 is tensioned along its axial orientation. More specifically, in this embodiment, the still-coated ends of the receiving optical fiber 112 are fixed on separate surfaces 152 using tape 154, for instance. Exerting a tension within the receiving optical fiber 112 can ease the other manipulations, as the receiving optical fiber 112 can remain steady.

Figure 4B:
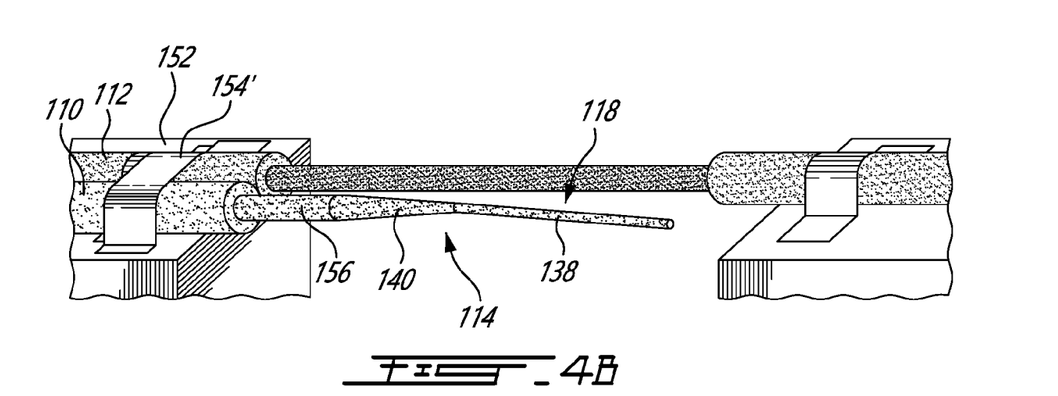
Figure 4C:
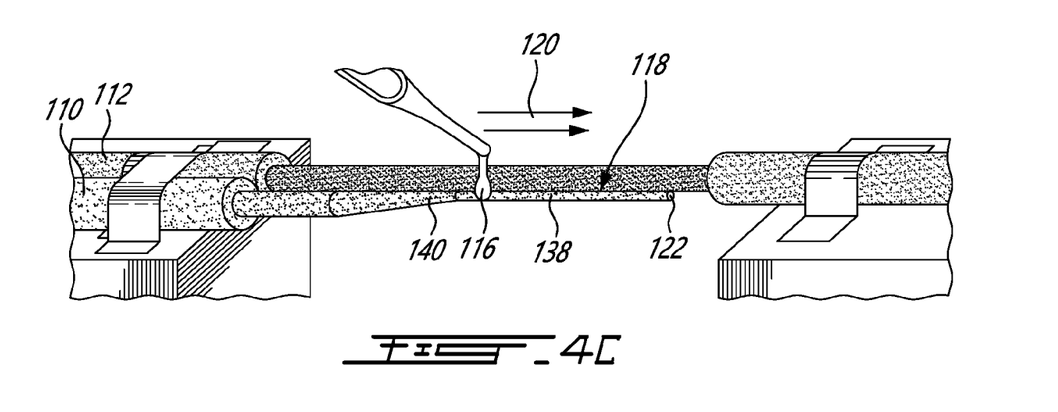

As shown in FIG. 4B, a still-coated portion of the feeding optical fiber 110 is fixed to one of the surfaces 152 alongside the receiving optical fiber, e.g., using another tape 154'. In this position, an un-tapered portion 156, the down-taper portion 140 and the waist portion 138 collectively form the free end 114 of the feeding optical fiber 110 which is partially free-standing alongside the receiving optical fiber 112. The feeding and receiving optical fibers 110 and 112 should be kept close to each other. As shown, since the free end 114 of the feeding optical fiber 110 is not fixed to anything at this point, the free end 114 is hanging in the air.

Figure 4D:
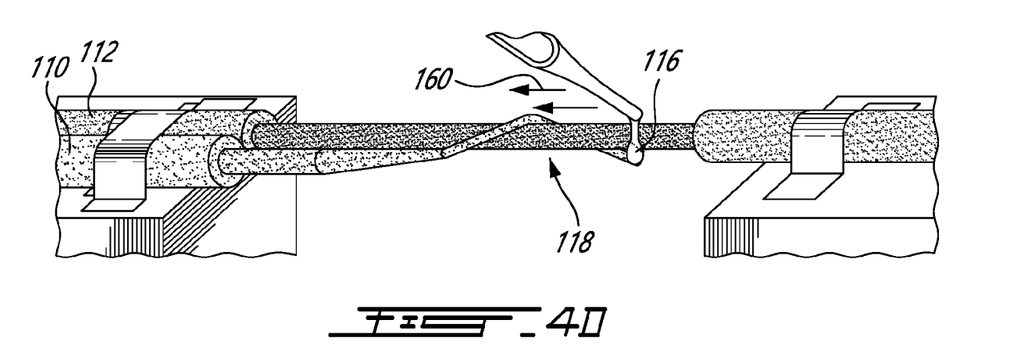
Figure 4E:
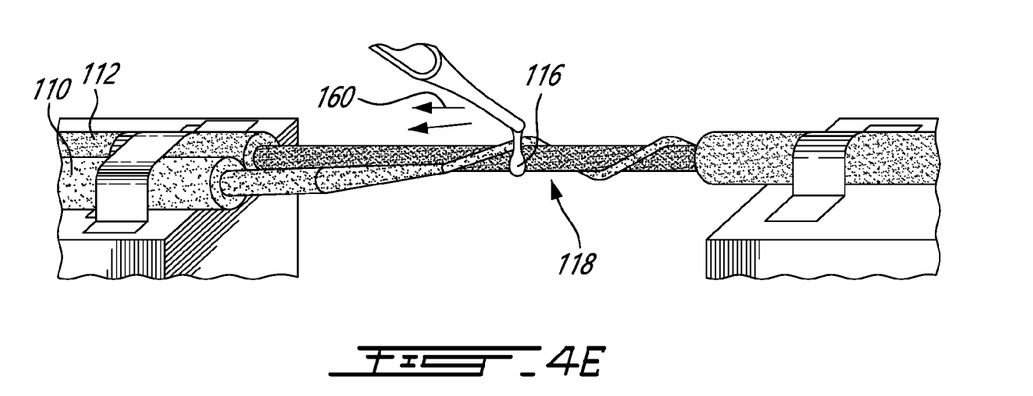
Figure 4F:
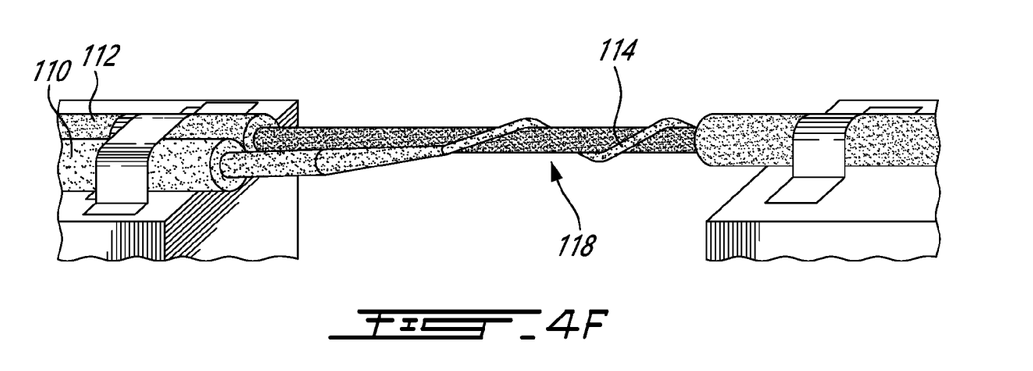

As discussed above, and shown in FIG. 4C, the liquid 116 can be injected within the coupling region 118, in this case located proximate a junction between the down-taper portion 140 and the waist portion 138, thereby causing the waist portion 138 of the feeding optical fiber 110 to move towards the receiving optical fiber 112. It was found that, in some embodiments, the free end 114 of the feeding optical fiber 110 helicoidally wraps itself around the second optical fiber 112 as the liquid 116 is gradually injected along a first direction 120 leading to a free tip 122 of the free end 114 of the feeding optical fiber 110. To favor such wrapping, it was found convenient to inject the liquid 116 in back and forth sequences including injecting the liquid 116 along the first direction 120 and then in the opposite direction 160 as shown in FIG. 4D, and so forth, until the free end 114 has helicoidally wrapped itself around the second optical fiber 112 for a desired number of turn(s) In some embodiments, the desired number of turn(s) can be at least 0.25, preferably at least 0.5 and most preferably at least 1.0. For instance, in some preferred embodiments, the desired number of turns varies from 2 to 4 turns. Such a lasso-type wrapping favors a satisfactory contact between the free end 114 and the receiving optical fiber 112. FIG. 4F shows the feeding and receiving optical fibers 110 and 112 being optically coupled to one another according to the method(s) described herein once the liquid 116 has evaporated, which can require few minutes. It is hypothesized that the free end 114 helicoidally wraps itself around the receiving optical fiber 112, and that it stays so thereafter, due to friction and/or intermolecular forces acting between the free end 114 of the feeding optical fiber 110 and the receiving optical fiber 112. The fashion with which the free end 114 wraps itself around the receiving optical fiber 112 can be advantageous in at least some circumstances. For instance, in embodiments where the feeding optical fiber 110 and/or receiving optical fiber 112 have multi-core, e.g., a number of cores which are circumferentially distributed within the cladding, the wrapping can bring each one of the cores closer to the other optical fiber which can in turn enhance the coupling efficiency of the resulting optical coupler. In some embodiments, as the feeding optical fiber 110 is brought in the coupling region 118, the receiving optical fiber 112 is also tensionless, not under tension or otherwise loose. In some other embodiments, the free end 114 of the feeding optical fiber 110 may not wrap around the receiving optical fiber 112. For instance, the free end 114 may be parallel to the receiving optical fiber 112 at least along a given portion thereof.

To validate that the optical coupling is satisfactory, coupling efficiency tests can be performed. If the coupling efficiency is unsatisfactory, the feeding and receiving optical fibers 110 and 112 can be separated from one another, and the method can be repeated until the coupling efficiency is deemed satisfactory.

Figure 5:
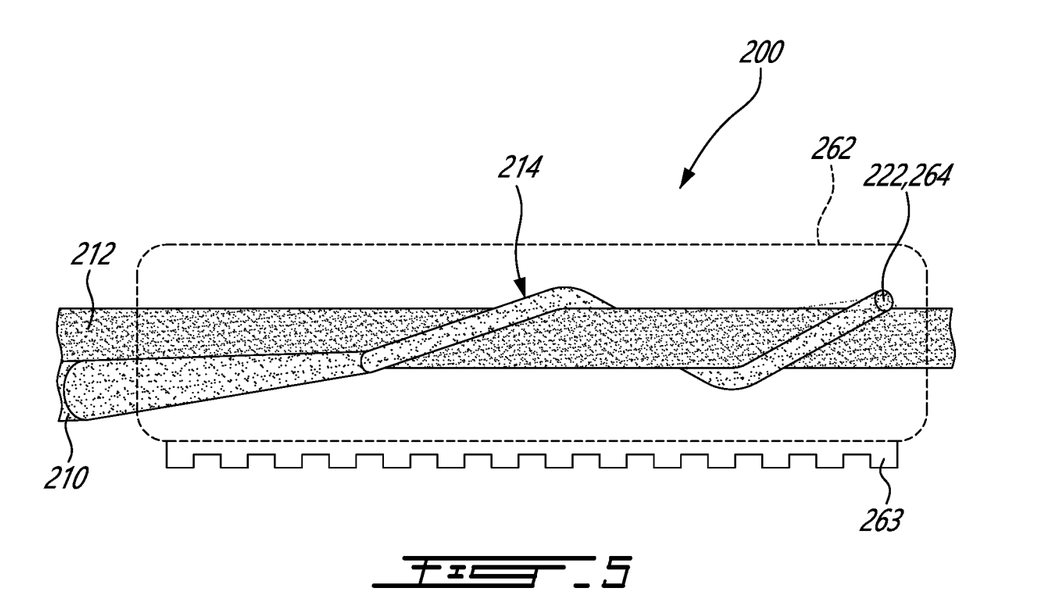
FIG. 5 is a schematic view of an example of an optical coupler in which a receiving optical fiber and a free end of a tapered feeding optical fiber have been adhered to one another within a coupling region, in accordance with one or more embodiments.

FIG. 5 shows a portion of an optical coupler 200 in which the contact between a free end 214 of a feeding optical fiber 210 and a receiving optical fiber 212 is fixed by applying a protector 262 such as an adhesive, a polymer (e.g., Cytop CTX-109 AE, Defensa EXP OP-255), a glass, or any other protecting material, along the coupling region 118. In such embodiments, the free tip 222 of the free end 214 preserves its cleaved-cut endface 264. The cleaved-cut endface 264 may be a regular cut or an irregular cut, depending on the embodiment. In the illustrated embodiment, the cleaved-cut endface 264 lies under the protector 214. However, in some other embodiment, the cleaved-cut endface 264 may not be under the protector 214 as the protector 214 may only partially cover the free end 214. In some embodiments, the adhesive and/or polymer can have a refractive index that is lower than that of the feeding and receiving optical fibers 210 and 212 to guide light propagating therein confined within the optical fibers and increase the coupling efficiency. However, in some other embodiments, the refractive index of the adhesive and/or polymer may be equal or greater than a refractive index of the feeding and receiving optical fibers 210 and 212. In some embodiments, the polymer can be UV-curable. In some other embodiments, the protector can be provided in the form of two glass slides which sandwich the feeding and receiving optical fibers 210 and 212 to one another. In some embodiment, the polymer can be used as well in addition to the two glass slides. As shown in this specific embodiment, the protector 262 can be in physical contact with a heatsink 263.

For instance, an optical coupler in which the feeding and receiving optical fibers 110 and 112 are optically coupled such as shown in FIG. 4F (without adhesive or polymer) has achieved a ~92% of coupling efficiency whereas the optical coupler 200 of FIG. 5 has achieved a ~95% coupling efficiency.

In addition to being less time consuming, such fuse-less optical couplers have been found to be useful in applications where the shape of the receiving optical fiber is to be preserved, e.g., such as in optical communication applications, and where light is to be optically coupled between two fibers of different materials that cannot be fused to one another due to their differing melting temperatures.

Figure 6:
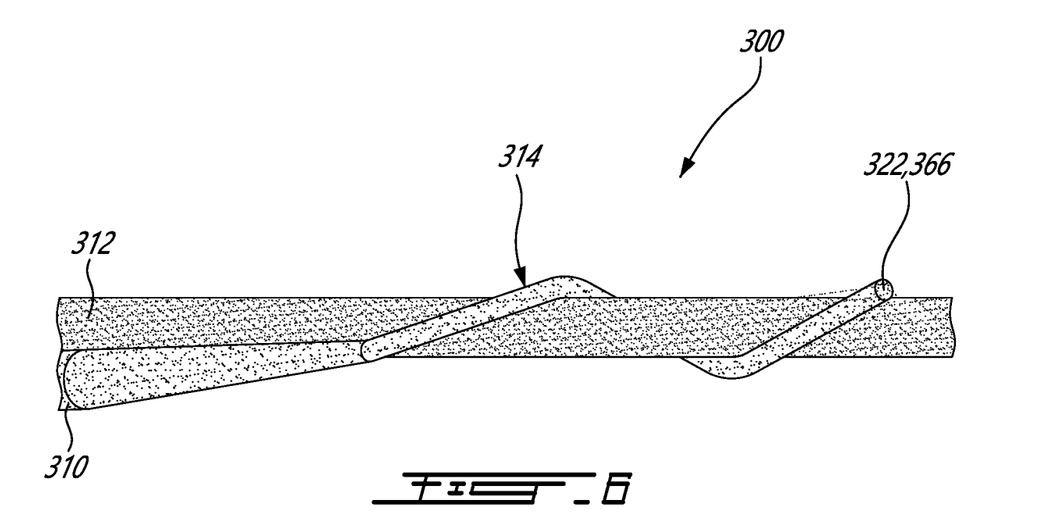
FIG. 6 is a schematic view of an example of an optical coupler in which a receiving optical fiber and a free end of a tapered feeding optical fiber have been fused to one another within a coupling region, in accordance with one or more embodiments.

FIG. 6 shows an alternative optical coupler 300 in which the contact between a free end 314 of a feeding optical fiber 310 and a receiving optical fiber 312 is fixed by fusing the free end 314 and the receiving optical fiber 312 to one another. In such embodiments, the free tip 322 of the free end 314 is melted a little and thus has a melted-like appearance with for instance a rounded endface 366. In some embodiments, only a portion of the free end 314 may be fused to the receiving optical fiber 312, thereby leaving the free tip 322 with a cleaved-cut endface.

Such optical couplers find applications in cladding pumped fiber lasers and fiber amplifiers. In these lasers, the fiber core contains active ions to which energy must be provided to put them into their excited states that will provide gain for lasers or amplifiers. The energy can be provided by a lower wavelength pump laser. In the case of high power, multi-core or multi-material fiber lasers or amplifiers, it may be beneficial to inject the pump in the fiber cladding. Such optical couplers provides a means to inject the pump in the cladding that has very good efficiency, is simple, easy to use and compatible with multi-core fibers and coupling between different fiber materials (for example from a silica feeding fiber to a fluoride receiving fiber).

In some embodiments, the length of the down taper portion can be at least 4.0 cm, preferably at least 5.0 cm, and most preferably at least 7.0 cm. The length of the waist portion can be at least 1.0 cm, preferably at least 2.0 cm and most preferably at least 4.0 cm. The diameter of the waist portion can range between 15 µm and 44 µm in some embodiments. These exemplary values are provided as examples only, as other dimensions for the length of the down-taper portion, the length of the waist portion and its dimension can be used in some other embodiments. In view of some experiments, it was found that by increasing the length of the down-taper portion and by reducing the diameter of the waist portion may lead to increased coupling efficiency.

EXAMPLE 1

Optical Coupler

An optical coupler was formed by optically coupling a coreless optical fiber made of a silica-based glass, and a down-taper portion having a length of 75 mm and a length of 2.0 cm to a double-clad optical fiber made of silica-based glass, with a diameter of 22 µm for the waist portion. The contact was fixed using a low refractive index polymer. A coupling efficiency of about ~92% was achieved with this coupler.

EXAMPLE 2

Optical Coupler

An optical coupler was formed by optically coupling a coreless optical fiber made of a silica-based glass, and a taper having a length of 75 mm to a double-clad optical fiber made of a low phonon energy glass and more specifically of ZBLAN. The contact was fixed using a low refractive index polymer. A coupling efficiency of about ~90% was achieved with this coupler.

EXAMPLE 3

Optical Coupler

An all-fiber-silica-to-fluoride glass fiber combiner was formed by optically coupling a coreless optical fiber made of a silica-based glass to which is fusion spliced a coreless fiber taper having a length of 90 mm to a double-clad optical fiber made of a 7% erbium-doped ZBLAN. The contact was fixed using a low refractive index polymer. A coupling efficiency of about ~90% was achieved with this coupler.

As can be understood, the examples described above and illustrated are intended to be exemplary only. For instance, it may be appreciated that the feeding optical fiber is to be optically coupled to a cladding of the receiving optical fiber in some embodiments. In some embodiments, the liquid needs not to be evaporated prior to adhering and/or fusing the receiving and feeding optical fibers to one another, as the liquid could simply be removed using a cloth. Moreover, in some embodiments, the feeding optical fiber can be cut at some point along the down-taper portion, thereby removing a portion of the down-taper portion, the waist portion and the up-taper portion. In such embodiments, the free end of the feeding optical fiber can move within the liquid towards the receiving optical fiber as long as its dimension is below the critical dimension. It is expected that the first and second optical fibers can be brought towards one another along a lateral orientation. More specifically, in some other embodiments, the first and second optical fibers can be brought towards one another in an oblique manner. The scope is indicated by the appended claims.

What is claimed is:

1. A method of optically coupling a first optical fiber and a second optical fiber to one another, the method comprising: bringing a free end of the first optical fiber, the second optical fiber and liquid in close proximity to one another within a coupling region, the free end of the first optical fiber having a dimension below a critical dimension, the free end of the first optical fiber moving within said liquid to contact the second optical fiber along a given coupling length, said moving including the free end at least partially wrapping around the second optical fiber along the given coupling length, said contact optically coupling the free end of the first optical fiber and the second optical fiber to one another.

2. The method of claim 1 wherein during said bringing the second optical fiber is free of tension.

3. The method of claim 1 wherein said bringing includes bringing the free end and the second optical fiber in close proximity to one another within the coupling region and then injecting the liquid within said coupling region.

4. The method of claim 1 further comprising allowing said liquid to evaporate and adhering the free end of the first optical fiber and the second optical fiber to one another.

5. The method of claim 1 further comprising, prior to said bringing, tapering the first optical fiber leaving a waist portion extending between down- and up-taper portions, and removing one of the down- and up-taper portions from the first optical fiber to free the waist portion thereby acting as the free end of the first optical fiber.

6. The method of claim 5 further removing the waist portion, thereby leaving the other one of the down- and up-taper portions acting as the free end of the first optical fiber.

7. The method of claim 1 further comprising tensioning the second optical fiber during said bringing.

8. The method of claim 1 wherein said wrapping including the free end wrapping around the second optical fiber for at least a complete turn.

9. The method of claim 1 wherein said bringing is performed gradually in a direction leading to a free tip of the free end of the first optical fiber.

10. The method of claim 1 wherein the liquid is an alcohol.

11. The method of claim 1 wherein the first and second optical fibers are made from dissimilar materials.

12. The method of claim 11 wherein the first optical fiber is made of silica and the second optical fiber is made of a low phonon energy glass.

13. The method of claim 1 wherein said second optical fiber is a multi-core optical fiber.

14. The method of claim 1 wherein the dimension of the free end of the first optical fiber is below a dimension of the second optical fiber.

15. An optical coupler comprising a first optical fiber, a second optical fiber optically coupled to the first optical fiber, the first optical fiber having free end having a dimension below a critical dimension, the free end of the first optical fiber being wrapped around the second optical fiber along a given coupling length thereby providing an optical coupling, and a protector over the free end and the second optical fiber along the given coupling length, the free end having a free tip with a cleaved-cut endface.

16. The optical coupler of claim 15 wherein the protector is made of at least one of a polymer and a glass having a refractive index lower than that of the first and second optical fibers.

17. The optical coupler of claim 15 wherein said protector is in physical contact with a heatsink.

18. The optical coupler of claim 15 wherein the first and second optical fibers are made from dissimilar materials.

19. The optical coupler of claim 15 wherein the first optical fiber is made of silica and the second optical fiber is made of a low phonon energy glass.

20. The optical coupler of claim 15 wherein the free end and the second optical fiber are fused to one another along the given coupling length, the free end having a free tip with a rounded endface.

21. The optical coupler of claim 15 wherein the free end is wrapped around the second optical fiber for at least a complete turn.

22. The optical coupler of claim 15 wherein the free end of the first optical fiber has a length above a given length threshold.

23. The optical coupler of claim 15 wherein the dimension of the free end of the first optical fiber is below a dimension of the second optical fiber.

* * * * *